(12) United States Patent
Tausa et al.

(10) Patent No.: US 9,106,076 B2
(45) Date of Patent: Aug. 11, 2015

(54) DIFFERENTIAL PROTECTION IN ELECTRICAL POWER NETWORKS

(71) Applicant: ABB Technology AG, Zurich (CH)

(72) Inventors: Mika Tausa, Tampere (FI); Kari Vanhala, Vähäkyrö (FI)

(73) Assignee: ABB TECHNOLOGY AG, Zurich (CH)

( * ) Notice: Subject to any disclaimer, the term of this patent is extended or adjusted under 35 U.S.C. 154(b) by 35 days.

(21) Appl. No.: 13/929,112

(22) Filed: Jun. 27, 2013

(65) Prior Publication Data

US 2014/0002937 A1    Jan. 2, 2014

(30) Foreign Application Priority Data

Jun. 29, 2012  (EP) .................................... 12174387

(51) Int. Cl.
*H02H 3/34* (2006.01)
*H02H 7/045* (2006.01)
*H02H 3/347* (2006.01)
*H02H 3/28* (2006.01)

(52) U.S. Cl.
CPC ............. *H02H 3/343* (2013.01); *H02H 3/283* (2013.01); *H02H 3/347* (2013.01); *H02H 7/045* (2013.01); *H02H 7/0455* (2013.01)

(58) Field of Classification Search
CPC ............................ H02H 7/045; H02H 7/0455
USPC ........................................................ 361/76
See application file for complete search history.

(56) References Cited

U.S. PATENT DOCUMENTS

| 4,951,170 | A * | 8/1990 | Fromm ........................... 361/87 |
| 6,311,307 | B1 * | 10/2001 | Adamiak et al. .............. 714/799 |
| 6,507,184 | B1 * | 1/2003 | Elston ........................... 324/107 |
| 6,915,219 | B2 * | 7/2005 | Premerlani ...................... 702/58 |
| 7,660,088 | B2 * | 2/2010 | Mooney et al. .................. 361/63 |
| 2006/0198073 | A1 * | 9/2006 | Cvorovic ........................ 361/90 |
| 2011/0063769 | A1 | 3/2011 | Kasztenny et al. |

FOREIGN PATENT DOCUMENTS

WO    2011/035052 A1    3/2011

OTHER PUBLICATIONS

Extended European Search Report issued Nov. 19, 2012, by the European Patent Office in corresponding European Patent Application No. 12174387.6. (4 pages).

* cited by examiner

*Primary Examiner* — Scott Bauer
(74) *Attorney, Agent, or Firm* — Buchanan Ingersoll & Rooney PC (57) ABSTRACT

A method in a three-terminal differential protection includes measuring a terminal phase current ($I_{T1(y)}$, $I_{T2(y)}$, $I_{T3(y)}$) at each terminal (T1, T2, T3) of a protected zone of the differential protection in each phase (L1, L2, L3) to be protected, and determining a bias current ($I_{b(y)}$) of the phase on the basis of the terminal phase currents ($I_{T1(y)}$, $I_{T2(y)}$, $I_{T3(y)}$). The bias current determination includes subtracting phasor values of the terminal phase currents of two terminals from the phasor value of the terminal phase current of one terminal. The terminal phase current, which is a minuend in the phasor difference computation, is selected on the basis of the phase angles or amplitudes of the terminal phase currents.

25 Claims, 4 Drawing Sheets

DIFFERENTIAL PROTECTION IN ELECTRICAL POWER NETWORKS

RELATED APPLICATION

This application claims priority under 35 U.S.C. §119 to European Patent Application No. 12174387.6 filed in Europe on Jun. 29, 2012, the entire content of which is hereby incorporated by reference in its entirety.

FIELD

The present disclosure relates to a differential protection used in electrical power networks.

BACKGROUND INFORMATION

Differential protection is used for protecting generators, transformers, buses and power lines from the effects of internal faults, whereby the generator, transformer, bus or power line constitutes a protected zone of the differential protection. In the differential protection, the protected zone is delimited by current transformers connected to a protective relay, whereby a fault occurring inside the protected zone causes a protection operation provided by the protective relay, whereas no protection operation is caused by a fault occurring outside of the protected zone. The differential protection is thus an absolutely selective protection scheme since it only operates because of a fault occurring in a protected zone of its own.

In a differential protection scheme, currents on both sides of the protected zone are compared. The current comparison is carried out phase by phase such that the currents of the same phase on different sides of the protected zone are compared with each other. Under normal conditions, or in connection with a fault outside the protected zone, the currents on different sides of the protected zone are equal and there is no differential current flowing through the protective relay. If a fault develops inside the protected zone, the currents on different sides of the protected zone are no longer equal, which leads to a differential current flowing through the protective relay and causing the protective relay to operate.

Contrary to the ideal situation described above, in practice, there is usually some differential current originating, for example, from the magnetizing transformer current and current-dependent transformation errors of the current transformers as well as current transformer saturation. The magnetizing current is determined by the level of the system voltage and can therefore be viewed as constant, irrespective of load level. The transformation errors of the current transformers are, however, a function of the respective current level. The threshold value for the differential current in the protection operation of the protective relay is therefore not typically implemented as a constant differential current threshold value, but is formed as a function of a bias current, which can also be called a restraining current or a stabilizing current. The bias current represents the through-current of the zone being protected and it is widely used in differential protection to desensitize the protection in case of high currents flowing through the protected zone in order to avoid false operation of the protective relay due to differential currents that are not caused by the fault in the protected zone but by other reasons, some of which were explained above.

Figure 1:
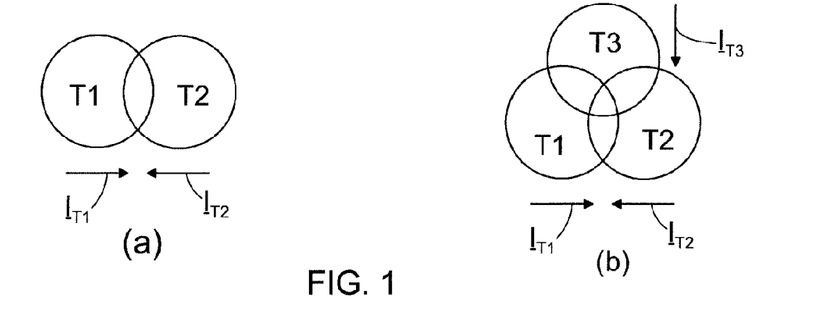
FIG. 1(a) shows schematically a two-terminal system.
FIG. 1(b) shows schematically a three-terminal system.

The general principle of the differential protection is further clarified with the following two examples relating to FIGS. 1(a) and 1(b). FIG. 1(a) discloses a schematic example of a two-terminal system including a first terminal T1 and a second terminal T2, where the first terminal T1 and the second terminal T2 form the protected zone. In a normal operating situation, there is a first terminal current $\underline{I}_{T1}$ flowing in to the protected zone and a second terminal current $\underline{I}_{T2}$ flowing out of the protected zone such that $\underline{I}_{T1} = \underline{I}_{T2}$, when the positive direction of the currents is determined to be towards the protected zone. Differential current $\underline{I}_{d(y)}$ in a two-terminal system is determined as $$\underline{I}_{d(y)} = \underline{I}_{T1(y)} + \underline{I}_{T2(y)} \quad (1)$$

One way to retrieve the bias current is to select the maximum of the currents flowing in and out of the protected zone, either phase-wise or by using one common bias for all phases. Another way is to take an average of the amplitudes of the currents flowing in and out of the protected zone.

A third way to retrieve the bias current for a two-terminal protected zone or a two-end protected zone, for example, for a two-winding transformer, is to take a phasor difference of currents flowing in and out of the protected zone per phase. Taking a phasor difference of currents flowing in and out of the protected zone is a good way to increase the sensitivity of the protection at internal faults while still maintaining the stability of the protection at through faults or other problematic situations. The stability of the protection means the capability of the protection to distinguish the differential current originating from a fault in the protected zone from differential currents originating from other reasons. When the positive direction of the current is defined to be towards the protected zone, the bias current per phase can be determined as follows:

$$I_{b(y)} = \frac{1}{2} |I_{T1(y)} - I_{T2(y)}|, \quad (2)$$

wherein $I_{b(y)}$ is the bias current $I_b$ in phase y, y=L1, L2, L3 for a three phase power system, $\underline{I}_{T1(y)}$ is the phasor value of the current in phase y at the first terminal of the protected zone, for example, on a high voltage side of a power transformer, and $\underline{I}_{T2(y)}$ is the phasor value of the current in phase y at the second terminal of the protected zone, for example, on a low voltage side of the power transformer. Further, as indicated above, the threshold value $I_{d(y)\_limit}$ for the operation of the differential current protection is not typically implemented as a constant differential current threshold value but is formed as a function of a bias current, i.e., $$I_{d(y)\_limit} = f(I_{b(y)}) \quad (3)$$

In connection with an ideal through-fault or loading situation, the amplitude of the bias current corresponds to the amplitudes of the currents on opposite sides of the protected zone, i.e. $I_{b(y)} = I_{T1(y)} = I_{T2(y)}$. Because the positive direction of the current is defined to be towards the protected zone as stated above, this means that in connection with the ideal through-fault or loading situation, the angle of the phasor $\underline{I}_{T1(y)}$ is opposite to the angle of the phasor $\underline{I}_{T2(y)}$, i.e., in connection with an ideal through-fault or loading situation $\underline{I}_{T1(y)} = -\underline{I}_{T2(y)}$. In an internal fault which is fed from both directions, the bias current $I_b$ decreases towards zero, causing maximum sensitivity to operating characteristics of the protection.

FIG. 1(b) discloses a schematic example of a three-terminal system including a first terminal T1, a second terminal T2 and a third terminal T3, where the first terminal T1, the second terminal T2 and the third terminal T3 form a protected zone. In a normal operating situation, there could be, for example, a first terminal current $\underline{I}_{T1}$ flowing in to the protected zone and a second terminal current $\underline{I}_{T2}$ and a third terminal current $\underline{I}_{T3}$ flowing out of the protected zone such that $\underline{I}_{T1}=-(\underline{I}_{T2}+\underline{I}_{T3})$, when the positive direction of the currents are determined to be towards the protected zone. Differential current $\underline{I}_{d(y)}$ in a three-terminal system is determined as $$\underline{I}_{d(y)}=\underline{I}_{T1(y)}+\underline{I}_{T2(y)}+\underline{I}_{T3(y)}, \quad (4)$$

and the bias current per phase is at the moment typically calculated by a sum of phasor current absolute values with an equation $$I_{b(y)} = \frac{1}{X}\left(|I_{T1(y)}| + |I_{T2(y)}| + |I_{T3(y)}|\right), \quad (5)$$

wherein $\underline{I}_{T3(y)}$ is the phasor value of the current in phase y at the third terminal T3 of the protected zone and X is a scaling factor having a value of one or two, depending on the differential protection provider. In the case of equation (5) the bias effect never disappears in connection with an internal fault but it can be even reinforced in the case of multi-end infeed. The threshold value $I_{d(y)\_limit}$ for the operation of the differential current protection is again formed as a function of a bias current according to equation (3).

In the determination of the bias current $I_b$ as disclosed above, it should be noted that before the phase current of individual terminals or ends can be compared, they must first be matched with respect to the absolute values and phase angle values such that in fault-free operation under idealized conditions the corresponding phase currents of the individual terminals or ends are scaled so that they are equivalent in absolute value and phase angle value.

SUMMARY

An exemplary embodiment of the present disclosure provides a method in a three-terminal differential protection in an electrical power network. The exemplary method includes measuring a terminal phase current at each terminal of a protected zone of the differential protection in each phase to be protected, and determining a bias current of the phase on the basis of the terminal phase currents. The determination of the bias current includes subtracting phasor values of the terminal phase currents of two terminals from the phasor value of the terminal phase current of a remaining one terminal. The terminal phase current, which is a minuend in the phasor difference computation, is selected on the basis of phase angles or amplitudes of the terminal phase currents.

An exemplary embodiment of the present disclosure provides a three-terminal differential protection system for an electrical power network. The exemplary differential protection system includes at least one current measurement device at each terminal of a protected zone of the differential protection system in each phase to be protected for measuring terminal phase currents at each terminal. The exemplary differential protection system also includes at least one intelligent electronic device configured to determine a bias current of the phase on the basis of the terminal phase currents obtained by measuring terminal phase currents at each terminal for each phase to be protected. The intelligent electronic device is configured for the bias current determination to subtract phasor values of terminal phase currents of two terminals from the phasor value of the terminal phase current of a remaining one terminal. The terminal phase current, which is a minuend in the phasor difference computation, is selected on the basis of phase angles or amplitudes of the terminal phase currents.

An exemplary embodiment of the present disclosure provides an intelligent electronic device including a processor and a non-transitory computer-readable recording medium, which has recorded thereon a computer program that, when executed by the processor, causes the intelligent electronic device to execute a method in a three-terminal differential protection in an electrical power network. The method includes measuring a terminal phase current at each terminal of a protected zone of the differential protection in each phase to be protected, and determining a bias current of the phase on the basis of the terminal phase currents. The determination of the bias current includes subtracting phasor values of the terminal phase currents of two terminals from the phasor value of the terminal phase current of a remaining one terminal. The terminal phase current, which is a minuend in the phasor difference computation, is selected on the basis of phase angles or amplitudes of the terminal phase currents.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Exemplary embodiments of the present disclosure provide a unique solution for determining a bias current for a three-terminal or three-end differential protection.

According to an exemplary embodiment, a method in a three-terminal differential protection in an electrical power network includes measuring a terminal phase current at each terminal of a protected zone of the differential protection in each phase to be protected, and determining a bias current of the phase on the basis of the terminal phase currents. The bias current determination includes subtracting phasor values of the terminal phase currents of two terminals from the phasor value of the terminal phase current of a remaining one terminal. The terminal phase current, which is a minuend in the phasor difference computation, is selected on the basis of phase angles or amplitudes of the terminal phase currents.

A three-terminal differential protection system for an electrical power network includes at least one current measurement device at each terminal of a protected zone of the differential protection system in each phase to be protected for measuring terminal phase currents at each terminal, and at least one intelligent electronic device configured to determine a bias current of the phase on the basis of the terminal phase currents obtained by measuring terminal phase currents at each terminal for each phase to be protected. The intelligent electronic device is configured for the bias current determination to subtract phasor values of terminal phase currents of two terminals from the phasor value of the terminal phase current of a remaining one terminal. The terminal phase current, which is a minuend in the phasor difference computation, is selected on the basis of phase angles or amplitudes of the terminal phase currents.

An exemplary embodiment of the present disclosure provides a non-transitory computer-readable recording medium having tangibly recorded thereon a computer program which causes a microprocessor or signal processor of an intelligent electronic device to execute the method of the present disclosure.

According to an exemplary embodiment, the method includes measuring a terminal phase current at each terminal of the protected zone of the differential protection in each phase to be protected. The method further includes determining a bias current of the phase on the basis of the terminal phase currents. The bias current determination includes subtracting phasor values of the terminal phase currents of two terminals from the phasor value of the terminal phase current of a remaining one terminal, and the terminal phase current, which is a minuend in the phasor difference computation, is selected on the basis of the phase angles or amplitudes of the terminal phase currents.

In accordance with an exemplary embodiment of the present disclosure, the phase angle information on the terminal phase currents measured at different terminals is preserved, whereby the bias current can be determined more accurately than before, because in known techniques, the phase angle information on the terminal phase currents measured at different terminals is omitted. The more accurate bias current determination makes it possible to improve the sensitivity of the differential protection, whereby at least some faults occurring in the protected zone can be detected more reliably than before, meaning that damages to the electrical power network and components connected therein as well as possible damages to the surroundings can be reduced.

According to an exemplary embodiment, the bias current is determined with an equation $$I_{b(y)} = \frac{1}{X} |\underline{I}_{A(y)} - \underline{I}_{B(y)} - \underline{I}_{C(y)}|,$$

wherein $I_{b(y)}$ is the bias current in phase y, y=L1, L2, L3, $\underline{I}_{A(y)}$, $\underline{I}_{B(y)}$ and $\underline{I}_{C(y)}$ are phasor values of the terminal phase currents corresponding to phase currents measured at each terminal, and X is a scaling factor having a value one or two, for example.

According to an exemplary embodiment, the terminal phase current, which is a minuend in the phasor difference computation, is selected to be the terminal phase current whose absolute phase angle difference from the phase angles of both the remaining terminal phase currents exceeds 120 degrees.

According to an exemplary embodiment, the terminal phase current, which is a minuend in the phasor difference computation, is selected to be the terminal phase current whose amplitude is the highest one.

Figure 2:
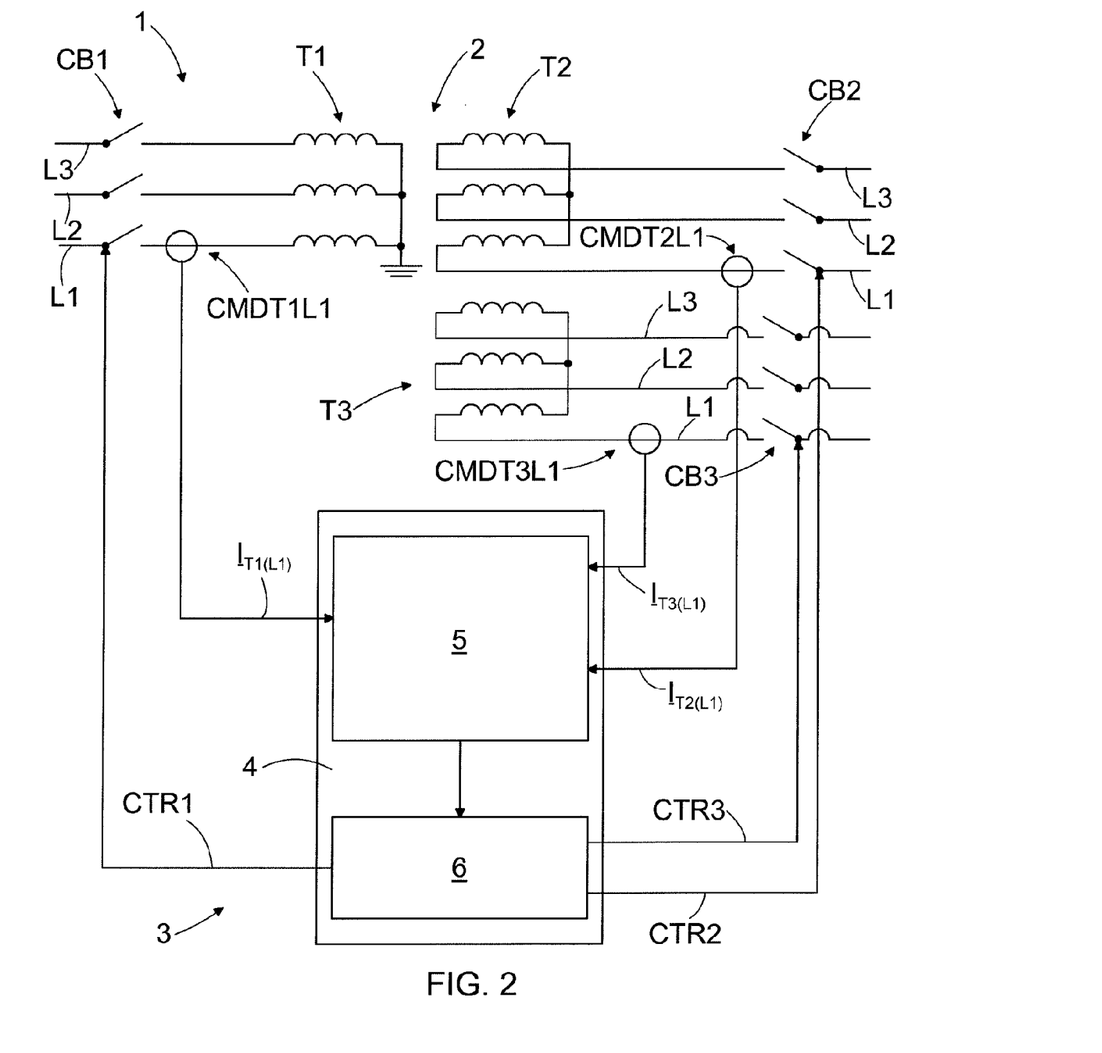
FIG. 2 shows schematically an example of a three-terminal differential protection system for power transformer protection, according to an exemplary embodiment of the present disclosure.

FIG. 2 shows schematically a portion of an electrical power network 1 according to an exemplary embodiment of the present disclosure which includes three phases, i.e. phases L1, L2, and L3. The electrical power network 1 includes a power transformer 2 having three terminals, i.e. terminals T1, T2, and T3, wherein the first terminal T1 is composed of transformer windings on a high voltage side of the transformer 2, and the second terminal T2 is composed of transformer windings on a low voltage side of the transformer 2. The third terminal T3 of the transformer 2 is composed of another set of transformer windings on the low voltage side of the transformer 2. The set of the transformer windings forming the third terminal T3 can, for example, provide an auxiliary transformer for providing power for equipment at a power station where the transformer 2 is located. For the sake of clarity, the power station is not disclosed in FIG. 2 more precisely. On the high voltage side of the transformer 2, there is a three-phase circuit breaker CB1, and on the low voltage side of the transformer 2 there are three-phase circuit breakers CB2 and CB3, the circuit breakers being intended to be used for disconnecting the power transformer 2 from the electrical power network 1 in case of an internal fault in the transformer 2, such as a short circuit.

The three-terminal power transformer 2 of FIG. 2 can be protected against internal faults with a three-terminal differential protection system. FIG. 2 shows schematically a three-terminal differential protection system 3 including an intelligent electronic device 4, which can also be called an IED 4, and current measuring devices connected to the intelligent electronic device 4 and configured to provide necessary protection control actions in the differential protection system 3. The three-terminal differential protection system 3 of FIG. 2 thus includes a first current measuring device CMDT1L1 for measuring terminal phase current $\underline{I}_{T1(L1)}$ in phase L1 of the first terminal T1, a second current measuring device CMDT2L1 for measuring terminal phase current $\underline{I}_{T2(L1)}$ in phase L1 of the second terminal T2, and a third current measuring device CMDT3L1 for measuring terminal phase current $\underline{I}_{T3(L1)}$ in phase L1 of the third terminal T3. The three-terminal differential protection system 3 of FIG. 2 can also include respective current measuring devices for measuring terminal phase currents at each terminal T1, T2, and T3 also in phases L2 and L3 but, for the sake of clarity, no current measuring devices for phases L2 and L3 are shown in FIG. 2. The current measuring devices can be connected to the intelligent electronic device 4 for providing information on the terminal phase current measurement to the intelligent electronic device 4, which may have the form of a protective relay, according to an exemplary embodiment. The intelligent electronic device 4 is configured, on the basis of the terminal phase current measurements at each terminal, to determine whether a fault exists in the protected zone of the differential protection system 3. In the differential protection, the protected zone is delimited by the current measuring devices, the protected zone of the differential protection system 3 of FIG. 2 thus being the transformer 2. In the case of a fault in the transformer 2, the intelligent electronic device 4 is configured to operate, or in other words, to provide a control signal for disconnecting the transformer 2 from the electrical power network 1 by opening the circuit breakers CB1, CB2 and CB3 which, in the case of FIG. 2, are shown in an open state.

The current measuring devices CMDT1L1, CMDT2L1, and CMDT3L1 may have the form of a current transformer, according to an exemplary embodiment. The terminal phase current information provided by each current measuring device can be communicated to the intelligent electronic device 4 as a continuous measuring signal by using a wired connection. In such a case, the intelligent electronic device 4 includes necessary sampling circuits for transforming each continuous terminal phase current measuring signal into a sequence of samples of the measured signal at a predetermined sampling frequency. The current measuring device can, however, include a sampling circuit for transforming the continuous terminal phase current measuring signal into a sequence of samples of the measured signal at a predetermined sampling frequency, and communication means for sending the measured sequence of samples to the intelligent electronic device 4 by using either a wired or a wireless connection. In both cases, the predetermined sampling frequency can be, for example, 1 kHz. The terminal phase currents $\underline{I}_{T1(L1)}$, $\underline{I}_{T2(L1)}$ and $\underline{I}_{T3(L1)}$ used in the following for the determination of the bias current $I_b$ in phase L1 are thus sample sequences of currents acting in phase L1 of the corresponding terminal T1, T2, and T3, each individual sample in the sequences corresponding to the specific terminal phase current at a specific discrete time. The vector format in the terminal phase current symbols $\underline{I}_{T1(L1)}$, $\underline{I}_{T2(L1)}$, and $\underline{I}_{T3(L3)}$ is intended to denote that both the amplitude information and the phase angle information on the terminal phase currents at each terminal T1, T2, and T3 is obtained.

As stated above, the bias current $I_b$ used in the differential protection scheme represents the through-current of the zone being protected. The bias current $I_b$ is used in the differential protection to desensitize the protection, in case of high currents flowing through the protected zone, for avoiding false operation of the protective relay due to differential currents that are not caused by the fault in the protected zone. In the following, the determination of the bias current $I_b$ in the differential protection system 3 and the intelligent electronic device 4 of FIG. 2 are described on the basis of the terminal phase currents $\underline{I}_{T1(L1)}$, $\underline{I}_{T2(L1)}$ and $\underline{I}_{T3(L1)}$ describing the currents in phase L1 at the terminals T1, T2, and T3, but the determination of the bias current $I_b$ is similar to that in connection with the phases L2 and L3 of the protected zone.

According to an exemplary embodiment of the present disclosure, the bias current $I_{b(y)}$ of a certain phase can be determined with an equation $$I_{b(y)} = \frac{1}{X}|I_{A(y)} - I_{B(y)} - I_{C(y)}|, \quad (6)$$

wherein $I_{b(y)}$ is the bias current in phase y, y=L1, L2, L3, $\underline{I}_{A(y)}$, $\underline{I}_{B(y)}$ and $\underline{I}_{C(y)}$ are phasor values of the terminal phase currents at different terminals, and X is a scaling factor, the value of which can vary. When considering phase L1 and the terminal phase currents $\underline{I}_{T1(L1)}$, $\underline{I}_{T2(L1)}$ and $\underline{I}_{T3(L1)}$ at terminals T1, T2, and T3 in phase L1, the general form presented in equation (6) takes the form $$I_{b(L1)} = \frac{1}{X}|I_{A(L1)} - I_{B(L1)} - I_{C(L1)}|, \quad (7)$$

wherein $I_{b(L1)}$ is the bias current in phase $\underline{I}_{A(L1)}$, $\underline{I}_{B(L1)}$ and $\underline{I}_{C(L1)}$ are phasor values of the terminal phase currents at different terminals, and X is a scaling factor. As described above, the value of the scaling factor can vary but, for example, values one and two can be used for the value of the scaling factor. A new value for the bias current $I_{b(L1)}$ can be calculated every time when new samples of the terminal phase currents $\underline{I}_{A(L1)}$, $\underline{I}_{B(L1)}$ and $\underline{I}_{C(L1)}$ are available or a new value for the bias current $I_{b(L1)}$ can be calculated at certain time periods.

The selection of factors in equation (7), i.e., which terminal phase current of the three terminal phase currents $\underline{I}_{A(L1)}$, $\underline{I}_{B(L1)}$ and $\underline{I}_{C(L1)}$ is selected as the minuend $\underline{I}_{A(L1)}$ and which two terminal phase currents of the three terminal phase currents $\underline{I}_{A(L1)}$, $\underline{I}_{B(L1)}$ and $\underline{I}_{C(L1)}$ are selected as subtrahends $\underline{I}_{B(L1)}$ and $\underline{I}_{C(L1)}$, is considered next.

The selection of the minuend $\underline{I}_{A(L1)}$ and the subtrahends $\underline{I}_{B(L1)}$ and $\underline{I}_{C(L1)}$ in the phasor difference computation in equation (7) can be selected on the basis of the comparison of the phase angles of the terminal phase currents $\underline{I}_{T1(L1)}$, $\underline{I}_{T2(L1)}$, $\underline{I}_{T3(L1)}$ or on the basis of the comparison of the amplitudes of the terminal phase currents $\underline{I}_{T1(L1)}$, $\underline{I}_{T2(L1)}$, $\underline{I}_{T3(L1)}$.

When the minuend $\underline{I}_{A(L1)}$ in equation (7) is selected on the basis of the comparison of the phase angles of the terminal phase currents $\underline{I}_{T1(L1)}$, $\underline{I}_{T2(L1)}$, $\underline{I}_{T3(L1)}$, the phase angles of the terminal phase currents $\underline{I}_{T1(L1)}$, $\underline{I}_{T2(L1)}$ and $\underline{I}_{T3(L1)}$ are defined:

$$\alpha(\underline{I}_{T1(L1)}) = \arg(\underline{I}_{T1(L1)}),$$

$$\alpha(\underline{I}_{T2(L1)}) = \arg(\underline{I}_{T2(L1)}),$$

$$\alpha(\underline{I}_{T3(L1)}) = \arg(\underline{I}_{T3(L1)}), \quad (8)$$

wherein $\alpha(\underline{I}_{T1(L1)})$ is the phase angle of the terminal T1 phase current $\underline{I}_{T1(L1)}$, $\alpha(\underline{I}_{T2(L1)})$ is the phase angle of the terminal T2 phase current $\underline{I}_{T2(L1)}$ and $\alpha(\underline{I}_{T3(L1)})$ is the phase angle of the terminal T3 phase current $\underline{I}_{T3(4)}$. After the phase angles are determined, the phase angle values $\alpha(\underline{I}_{T1(L1)})$, $\alpha(\underline{I}_{T2(L1)})$ and $\alpha(\underline{I}_{T3(L1)})$ are compared with each other, and the minuend $\underline{I}_{A(L1)}$ in equation (7) is selected to be the terminal phase current whose absolute phase angle difference from the phase angle of both remaining terminal phase currents exceeds 120 degrees, being, for example, over 121 degrees. The two remaining terminal phase currents are selected to be the subtrahends $\underline{I}_{B(L1)}$ and $\underline{I}_{C(L1)}$ in equation (7) and their mutual order in equation (7) is irrelevant.

The selection of the minuend $\underline{I}_{A(L1)}$ in equation (7) on the basis of the phase angle criterion as explained above is a convenient way to select the minuend $\underline{I}_{A(L1)}$, because the criterion of the phase angle difference over 120 degrees can be true for only one terminal phase current in respect of the other two terminal phase currents at a time.

It is possible, however, that on occasion the phase angle criterion presented above is not true for any of the terminal phase currents. This can happen temporarily, for example, during transient situations, such as at a start or at an end of through faults or in internal faults fed from all directions or in internal faults fed from two directions only. In such cases, the minuend $\underline{I}_{A(L1)}$ in equation (7) cannot necessarily be selected in a reliable way by the phase angle criterion presented above. This can be the case if the amplitude of any of the terminal phase currents $\underline{I}_{T1(L1)}$, $\underline{I}_{T2(L1)}$, $\underline{I}_{T3(L1)}$ is too small for determining the phase angles of the terminal phase currents in a reliable way. In order to ensure this, a criterion can be set that the amplitude of each of the terminal phase currents $\underline{I}_{T1(L1)}$, $\underline{I}_{T2(L1)}$ and $\underline{I}_{T3(L1)}$ has to exceed a first minimum limit $I_{min\_limit\_1}$ set for the amplitude of the terminal phase current before either the computation of the phase angles of the terminal phase current $\underline{I}_{T1(L1)}$, $\underline{I}_{T2(L1)}$ and $\underline{I}_{T3(L1)}$ or the comparison between them is executed.

The amplitudes of the terminal phase currents $I_{T1(L1)}$, $I_{T2(L1)}$ and $I_{T3(L1)}$ are defined:

$$I_{T1(L1)} = |I_{T1(L1)}|,$$

$$|I_{T2(L1)}| = |I_{T2(L1)}|$$

$$I_{T3(L1)} = |I_{T3(L1)}|, \quad (9)$$

wherein $I_{T1(L1)}$ is the amplitude of the terminal T1 phase current $I_{T1(L1)}$, $I_{T2(L1)}$ is the amplitude of the terminal T2 phase current $I_{T2(L1)}$ and $I_{T3(L1)}$ is the amplitude of the terminal T3 phase current $I_{T3(L1)}$. If any of the amplitude values of the terminal phase current $I_{T1(L1)}$, $I_{T2(L1)}$ and $I_{T3(L1)}$ does not exceed the first limit value $I_{min\_limit\_1}$ set for the amplitude of the terminal phase current, the minuend $I_{A(L1)}$ in equation (7) is selected on the basis of the amplitude values of the terminal phase currents $I_{T1(L1)}$, $I_{T2(L1)}$ and $I_{T3(L1)}$. The first limit value can be set to be some per cents, such as 1.5%, of the nominal current of the protected object and depending on the measurement transformer accuracies. The minuend $I_{A(L1)}$ in equation (7) is also selected on the basis of the amplitude values of the terminal phase currents $I_{T1(L1)}$, $I_{T2(L1)}$ and $I_{T3(L1)}$ if all of the amplitude values of the terminal phase currents $I_{T1(L1)}$, $I_{T2(L1)}$ and $I_{T3(L1)}$ do exceed the first limit value $I_{min\_limit\_1}$ set for the amplitude of the terminal phase current but still no single terminal phase current whose absolute phase angle difference from the phase angle of both two remaining terminal phase currents exceed 120 degrees can be determined.

According to an exemplary embodiment, in order to prevent a terminal phase current whose absolute phase angle difference from both of the remaining terminal phase currents exceeds 120 degrees but whose amplitude is very small to be selected to be the minuend $I_{A(L1)}$, it can be provided with a second limit $I_{min\_limit\_2}$ value to be exceeded by the amplitude value of the terminal phase current whose absolute phase angle difference from both of the remaining terminal phase currents exceeds 120 degrees. This makes it possible, in case of an internal fault, to prevent a current having a small amplitude but going towards a load to be selected to be the minuend $I_{A(L1)}$. The second limit value $I_{min\_limit\_2}$ can be set to be, for example, 10 to 95% of the maximum amplitude of the amplitudes of the terminal phase currents.

When the selection of the minuend $I_{A(L1)}$ and the subtrahends $I_{B(L1)}$ and $I_{C(L1)}$ in equation (7) is selected on the basis of the comparison of the amplitudes of the terminal phase currents $I_{T1(L1)}$, $I_{T2(L1)}$, $I_{T3(L1)}$, the amplitudes $I_{T1(L1)}$, $I_{T2(L1)}$ and $I_{T3(L1)}$ are compared with each other and the minuend $I_{A(L1)}$ in equation (7) is selected to be the terminal phase current whose amplitude is the highest one. The two remaining terminal phase currents are selected to be the subtrahends $I_{B(L1)}$ and $I_{C(L1)}$ in equation (7) and their mutual order in equation (7) is irrelevant.

In the determination of the bias current $I_b$ as disclosed above, it should be noted that before the terminal phase currents of individual terminals or ends of the differential protection can be compared, they must first be matched with respect to the absolute values and phase angle values such that in fault-free operation the corresponding terminal phase current measuring signals at individual terminals or ends are scaled so that they are equivalent in absolute value and phase angle value.

Figure 3:
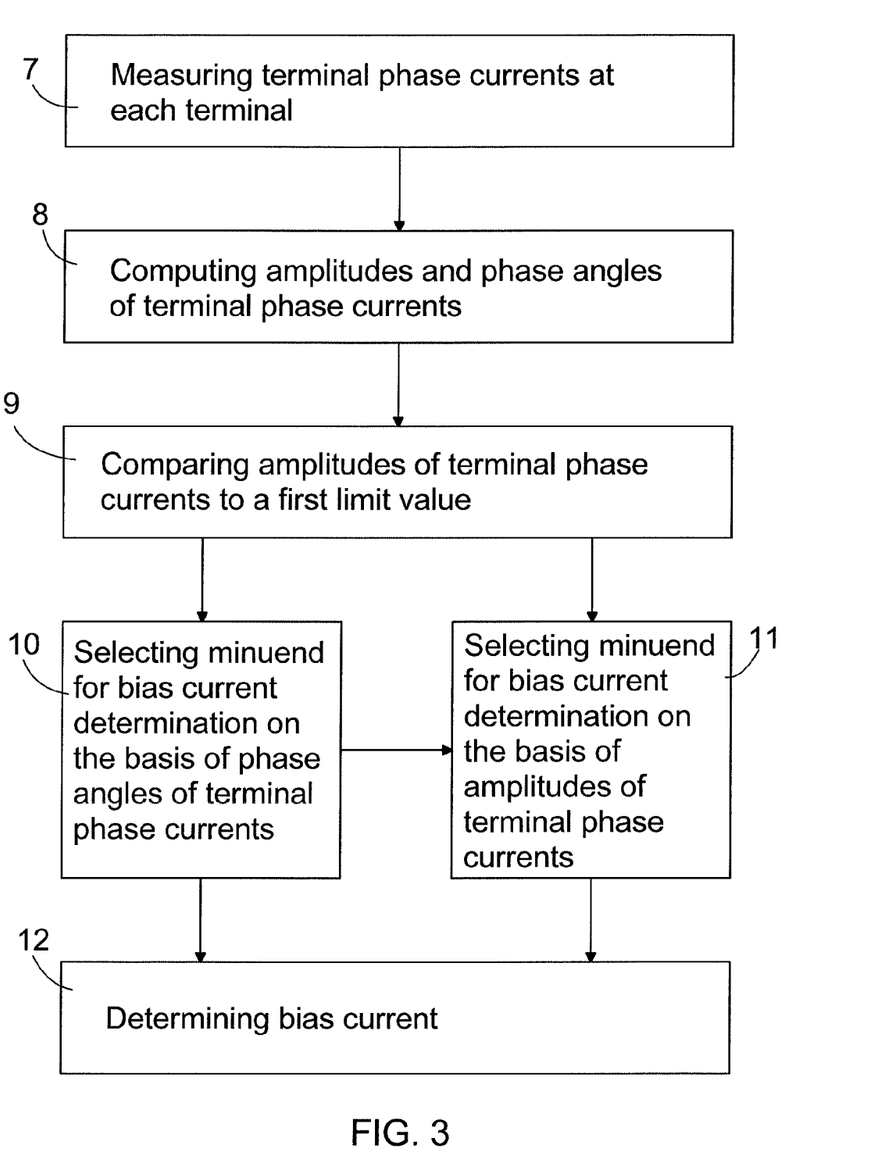
FIG. 3 shows schematically a flow diagram of bias current determination for a three-terminal differential protection system, according to an exemplary embodiment of the present disclosure.

FIG. 3 summarizes the determination or evaluation of the bias current $I_b$. The following description summarizes the determination or evaluation of the bias current $I_b$ with reference to phase L1, but as disclosed above, the same principle also applies to phases L2 and L3. As a first stage, referred to by reference number 7, the terminal phase currents and $I_{T1(L1)}$, $I_{T2(L1)}$ and $I_{T3(L1)}$ are measured at terminals T1, T2 and T3 in each phase to be protected. In the next stage, referred to by reference number 8, the amplitudes $I_{T1(L1)}$, $I_{T2(L1)}$ and $I_{T3(L1)}$ and phase angles $\alpha(I_{T1(L1)})$, $\alpha(I_{T2(L1)})$ and $\alpha(I_{T3(L1)})$ of the terminal phase currents are computed. In order to select whether the minuend in equation (7) is selected on the basis of the phase angles or amplitudes of the terminal phase currents, the amplitudes $I_{T1(L1)}$, $I_{T2(L1)}$ and $I_{T3(L1)}$ of the terminal phase currents are compared with a first limit value $I_{min\_limit\_1}$ set for the amplitude of the terminal phase current. This stage is referred to by reference number 9. If all the amplitude values $I_{T1(y)}$, $I_{T2(y)}$, $I_{T3(y)}$ of the terminal phase currents $I_{T1(L1)}$, $I_{T2(L1)}$, $I_{T3(L1)}$ exceed the first minimum limit $I_{min\_limit\_1}$ set for the amplitude of the terminal phase current, the method can proceed to the next stage, referred to by reference number 10, wherein the minuend in equation (7) is selected on the basis of the comparison of the phase angles $\alpha(I_{T1(L1)})$, $\alpha(I_{T2(L1)})$, $\alpha(I_{T3(L1)})$ of the terminal phase currents $I_{T1(L1)}$, $I_{T2(L1)}$, $I_{T3(L1)}$. In this stage, the phase angles $\alpha(I_{T1(L1)})$, $\alpha(I_{T2(L1)})$, $\alpha(I_{T3(L1)})$ of the terminal phase currents $I_{T1(L1)}$, $I_{T2(L1)}$, $I_{T3(L1)}$ are computed, unless already carried out at the same time as the amplitude values $I_{T1(L1)}$, $I_{T2(L1)}$, $I_{T3(L1)}$ of the terminal phase currents $I_{T1(L1)}$, $I_{T2(L1)}$ and $I_{T3(L1)}$ were computed. The phase angles $\alpha(I_{T1(L1)})$, $\alpha(I_{T2(L1)})$, $\alpha I_{T3(L1)}$ of the terminal phase currents are compared with each other, and the minuend in equation (7) is selected to be the terminal phase current whose absolute phase angle difference from the phase angles of both remaining terminal phase currents exceeds 120 degrees. After the minuend for equation (7) is selected, the bias current $I_b$ for the phase in question, in this example phase L1, can be computed or evaluated by using equation (7), in a stage referred to by reference number 12 in FIG. 3. The amplitude of that terminal phase current, which is selected to be the minuend in equation (7), can also be compared at this stage with the second limit value $I_{min\_limit\_2}$ set for the amplitude of the terminal phase current.

However, if any of the amplitude values $I_{T1(L1)}$, $I_{T2(L1)}$, $I_{T3(L1)}$ of the terminal phase currents $I_{T1(L1)}$, $I_{T2(L1)}$, $I_{T3(L1)}$ does not exceed the first limit value $I_{min\_limit\_1}$ set for the amplitude of the terminal phase current, or if the amplitude of that terminal phase current, which in stage 10 of FIG. 3 is selected to be the minuend, does not exceed the second limit value $I_{min\_limit\_2}$, the method can proceed to a stage referred to by reference number 11. In this stage 11, the minuend in equation (7) is selected on the basis of the comparison of the amplitudes $I_{T1(L1)}$, $I_{T2(L1)}$, $I_{T3(L1)}$ of the terminal phase currents $I_{T1(L1)}$, $I_{T2(L1)}$, $I_{T3(L1)}$ and the minuend is selected to be the terminal phase current whose amplitude is the highest one. When the minuend in equation (7) is selected in stage 11, the bias current $I_b$ for the phase in question can again be computed or evaluated by using equation (7) in stage 12.

In the example above, the minuend in the phasor difference computation in equation (7) is selected primarily on the basis of the phase angles of the terminal phase currents $I_{T1(L1)}$, $I_{T2(L1)}$, $I_{T3(L1)}$, but the minuend in equation (7) can also be selected directly on the basis of the amplitudes of the terminal phase currents $I_{T1(L1)}$, $I_{T2(L1)}$, $I_{T3(L1)}$.

The determination or computation of the bias current $I_b$ is implemented in the IED 4, which includes a bias current evaluation unit 5 for the computation of the bias current $I_b$. The bias current evaluation unit 5 can, for example, comprise a microprocessor or a signal processor and possibly one or more non-transitory computer-readable recording mediums (e.g., memory units) such as a non-volatile memory (e.g., ROM, hard disk drive, flash memory, etc.) to have recorded thereon a software program code (e.g., a computer program) which can be executed by the microprocessor or signal processor for carrying out the sampling of the terminal phase current measurement signals and necessary computation for the determination of the bias current $I_b$. The output of the bias current evaluation unit 5 is thus the value of the bias current $I_b$ for the phase in question, for example, $I_{b(L1)}$ for phase L1.

In the exemplary embodiment shown in FIG. 2, the value of the bias current $I_{b(L1)}$ is transferred further to a protection and control unit 6 included in the IED 4. The protection and control unit 6 determines the threshold value $I_{d(y)\_limit}$ for the operation of the differential current protection, as a function of the bias current, i.e., $$I_{d(y)\_limit} = f(I_{b(y)}), \quad (10)$$

wherein $I_{d(y)\_limit}$ is the threshold value for the differential current in phase y, y=L1, L2, L3, and $I_{b(y)}$ is the bias current in phase y, and on the basis of settings set for the particular differential protection scheme, whether a fault exists in the protected zone of the differential protection system 3. The protection and control unit 6 can, for example, comprise a microprocessor or a signal processor and possibly one or more non-transitory computer-readable recording mediums (e.g., memory units) such as a non-volatile memory (e.g., ROM, hard disk drive, flash memory, etc.) to have recorded thereon a software program code (e.g., a computer program) which can be executed by the microprocessor or signal processor for carrying out the determination whether or not a fault exists in the protected zone of the differential protection system 3.

The protection and control unit 6 determines that a fault exists inside the protected zone of the differential protection system 3 if the value of the differential current $I_{d(y)}$ is at least or above a given threshold value $I_{d(y)\_limit}$, and if other conditions indicating the presence of a fault inside the protected zone are fulfilled, for example, no harmonic frequencies or waveform based blockings are active. The protection operation of the phase to be protected can thus be initiated when the value of the differential current $I_{d(y)}$ is at least or above a given threshold value $I_{d(y)\_limit}$. If, additionally, other conditions indicating the presence of a fault inside the protected zone are fulfilled, the protection operation of a faulty phase can be provided. Thus, if the protection and control unit 6 determines that a fault exists inside the protected zone of the differential protection system 3, the protection and control unit 6 sends control signals CTR1, CTR2, CTR3 to actuators of the circuit breakers CB1, CB2, CB3 to open the circuit breakers, i.e. to disconnect the power transformer 2 or at least the faulty phase of the transformer 2 from the electrical power network 1. This minimizes possible damages to the electrical power network 1 and the power transformer 2 due to the fault. The operating or tripping characteristics of the differential protection scheme are generally known to a person skilled in the electrical power network control and protection schemes and, therefore, these characteristics are not represented in more detail herein. The operating characteristics for differential protection are represented for example in ABB 615 series Technical Manual, Document ID 1MRS756887, the entire disclosure of which is incorporated by reference herein.

The bias current determination procedure of the present disclosure is carried out, as described above, by a microprocessor or signal processor in the intelligent electronic device 4 executing one or more software or computer programs which are designed for the purpose and which are tangibly recorded on a non-transitory computer-readable recording medium such as a non-volatile memory. The intelligent electronic device 4 is thus configured to execute the operative features and steps of the present disclosure when the microprocessor or signal processor of the intelligent electronic device 4 executes the computer or software program tangibly recorded on the non-transitory computer-readable recording medium.

The actual implementation of the intelligent electronic device 4 can vary. According to an exemplary embodiment, the IED 4 can be implemented as a protection and control relay, which in addition to the determination of the bias current $I_b$ provides necessary protection and control functionality on the basis of the differential current $I_d$ and other conditions as described above. In the exemplary embodiment of FIG. 2, the IED 4 includes the protection and control unit 6 separate from the bias current evaluation unit 5, but in practice the IED 4 may include only a single unit configured to carry out the functions of both the bias current evaluation unit 5 and the protection and control unit 6. The IED 4 can, however, be any kind of device, such as a computer or the like, which can be configured to execute one or more software or computer programs designed to execute the disclosed actions and steps for determining the bias current and possibly necessary actions to protect the electrical power network or some component of the network against a fault in the protected zone.

When the bias current is determined as disclosed above, the phase angle information on the terminal phase currents measured at different terminals is preserved. This means that the bias current can be determined more accurately than before, because in known solutions the phase angle information on the terminal phase currents is not utilized. Because the bias current can be determined more accurately than before, the sensitivity of the differential protection can be improved, whereby the faults occurring in the protected zone can be detected more reliably or rapidly than before, whereby damages to the electrical power network and components connected therein as well as possible damages to the surroundings can be minimized.

Figure 4:
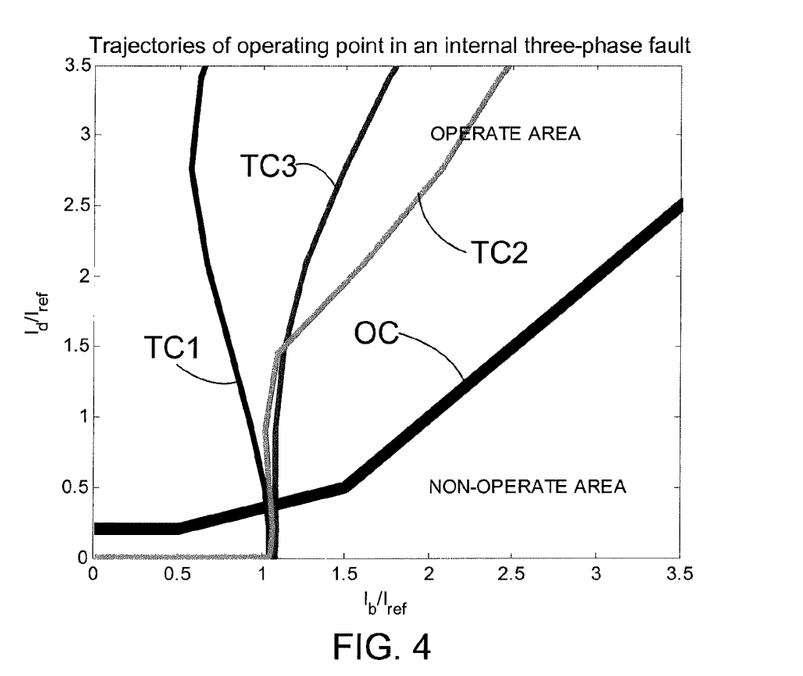
FIG. 4 shows schematically an example of an operation of a three-terminal differential protection during an internal three-phase fault, according to an exemplary embodiment of the present disclosure.
Figure 5:
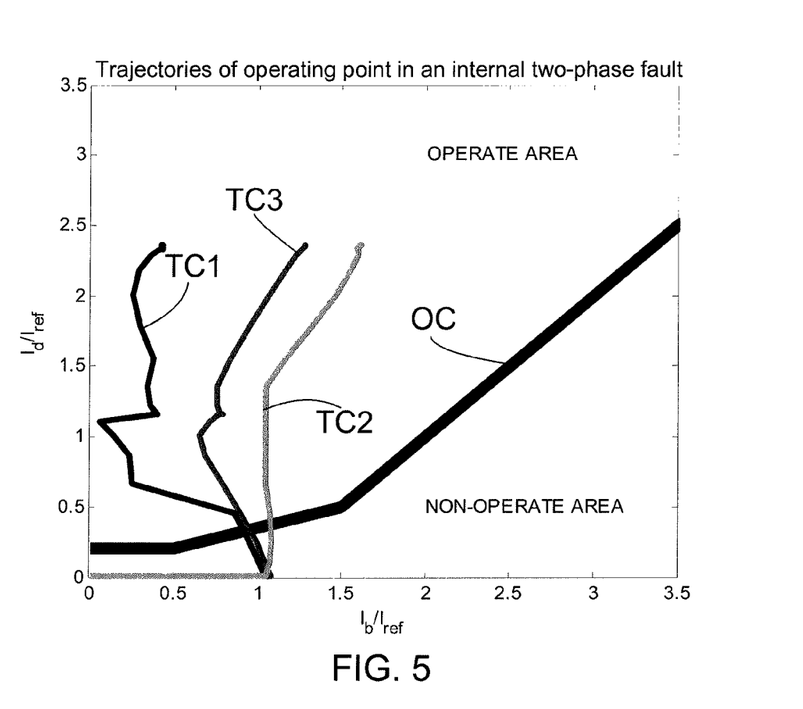
FIG. 5 shows schematically an example of an operation of a three-terminal differential protection during an internal two-phase fault, according to an exemplary embodiment of the present disclosure.
Figure 6:
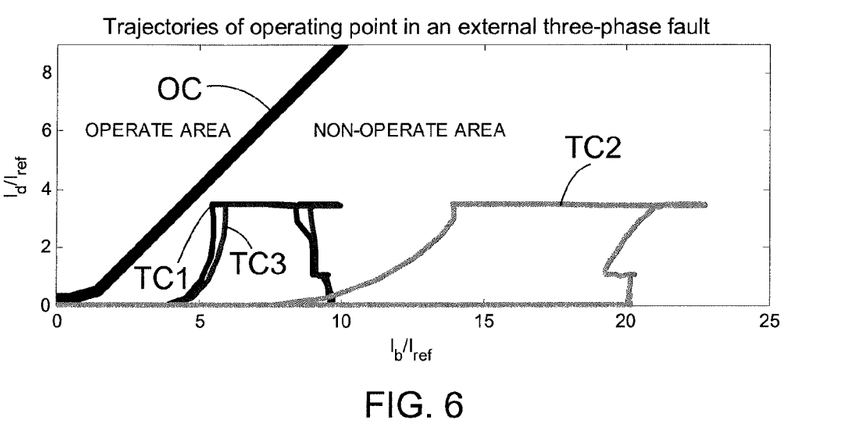
FIG. 6 shows schematically operation of a three-terminal differential protection during an external three-phase fault, according to an exemplary embodiment of the present disclosure.

FIGS. 4, 5 and 6 show schematically examples of the operation of a three-terminal differential protection when the bias current is determined according to the present disclosure and known implementations. FIG. 4 shows the operation during an internal three-phase fault, FIG. 5 shows the operation characteristics during an internal two-phase fault, and FIG. 6 shows the operation characteristics during an external three-phase fault. The operating characteristics present how fast the operating point of the system to be protected enters the operating area of the differential protection in case of a fault. In all these drawings, OC1 denotes the operating characteristic of the three-terminal differential protection, i.e. the value of the equation $I_{d(y)\_limit} = f(I_{b(y)})$ with different values of the bias current $I_{b(y)}$. TC1 denotes the trajectory of the operating point at different moments of time when the bias current is determined according to the present disclosure. TC2 denotes the trajectory of the operating point at different moments of time when the bias current is determined according to known implementations as a maximum current of the currents flowing in and out of the protected zone and having one common bias for all phases. TC3 denotes the trajectory of the operating point at different moments of time when the bias current is determined according to known implementations using equation (5), the scaling factor X being 2 in equation (5). The examples of FIGS. 4, 5 and 6 are based on simulated faults when a system to be protected has been a power transformer and naturally all the trajectories TC1, TC2 and TC3 relate to the bias current determination of the same phase of the transformer. Y axis in FIGS. 4, 5 and 6 denotes the relationship of the differential current $I_d$ to the reference current $I_{ref}$ and X axis denotes the relationship of the bias current $I_b$ to the reference current $I_{ref}$. The reference current $I_{ref}$ can be a nominal current of the protected object, such as a nominal current of a power transformer primary winding.

FIGS. 4 and 5 show that in both internal faults the trajectory TC1 relating to the present disclosure enter the operating area of the differential protection faster or earlier, i.e. with a smaller value of the relationship between the bias current and the reference current, than in known implementations. FIG. 6, in turn, shows that when the fault is outside the protected zone, the trajectory TC1 relating to the present solution behaves substantially similar as the trajectory TC3 relating to a known implementation. In FIG. 6, any of the trajectories, however, do not enter the operating area of the differential protection because the fault relating to FIG. 6 is outside of the protected zone.

In the exemplary embodiment of FIG. 2, the transformer windings on the high voltage side of the transformer are interconnected with a Y-connection or a star connection, and both transformer windings on the low voltage side of the transformer are interconnected with a D-connection or delta connection, but the bias current evaluation solution disclosed can be applied regardless of how the transformer windings are interconnected.

In the exemplary embodiment of FIG. 2, one terminal is provided on the high voltage side of the transformer and two terminals are provided on the low voltage side of the transformer, but the bias current evaluation solution disclosed can also be applied to cases where two terminals are provided on the high voltage side of the transformer and one terminal is provided on the low voltage side of the transformer.

In the exemplary embodiment of FIG. 2, the three-terminal differential protection system is applied to the protection of the power transformer forming part of the electrical power network or being a part of the electrical power network, but the same protection system can also be applied to the protection of generators, buses and power lines against the effects of internal faults, the generators, buses and power lines thus each being parts of electrical power networks.

The exemplary embodiment of FIG. 2 includes only one intelligent electronic device, but a three-terminal differential protection system can include several intelligent electronic devices, for example if a protected zone is a power line. If there are several intelligent electronic devices, the phasor values, the amplitudes and the phase angles, of the terminal phase currents can be determined at the intelligent electronic device relating to the measuring location of the specific terminal phase current and then communicated to the other intelligent electronic devices.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method in a three-terminal differential protection in an electrical power network, the method comprising:
   measuring a terminal phase current at each terminal of a protected zone of the differential protection in each phase to be protected;
   determining a bias current of the phase on the basis of the terminal phase currents;
   determining whether a fault exists in the protected zone based on a threshold value computed as a function of the bias current; and
   sending a control signal to a terminal of a respective protected zone upon the existence of a fault,
   wherein the determination of the bias current includes subtracting phasor values of the terminal phase currents of two terminals from the phasor value of the terminal phase current of a remaining one terminal, and
   wherein the terminal phase current, which is a minuend in the subtraction of phasor values, is selected on the basis of a comparison of phase angles or amplitudes of the terminal phase currents among the terminals.

2. A method according to claim 1, wherein the bias current of the phase is determined with $$I_{b(y)} = \frac{1}{X}|\underline{I}_{A(y)} - \underline{I}_{B(y)} - \underline{I}_{C(y)}|,$$

wherein $I_{b(y)}$ is the bias current in phase y, y=L1, L2, L3, $\underline{I}_{A(y)}$, $\underline{I}_{B(y)}$ and $\underline{I}_{C(y)}$ are phasor values of the terminal phase currents, and X is a scaling factor.

3. A method according to claim 2, wherein the scaling factor X has a value of one or two.

4. A method according to claim 1, wherein the terminal phase current, which is the minuend, is selected to be the terminal phase current whose absolute phase angle difference from the phase angles of both the remaining terminal phase currents exceeds 120 degrees.

5. A method according to claim 1, comprising:
   determining amplitudes of the terminal phase currents;
   comparing the determined amplitudes with a first limit value for the amplitude of the terminal phase currents; and
   if the amplitude of each terminal phase current exceeds the first limit value, determining the phase angles of the terminal phase currents, and selecting the minuend to be the terminal phase current whose absolute phase angle difference from the phase angles of both the remaining terminal phase currents exceeds 120 degrees.

6. A method according to claim 4, wherein the terminal phase current whose absolute phase angle difference from the phase angles of both the remaining terminal phase currents exceeds 120 degrees is selected to be the minuend only if the amplitude of this terminal phase current exceeds a second limit value for the amplitude of the terminal phase currents.

7. A method according to claim 5, wherein the terminal phase current whose absolute phase angle difference from the phase angles of both the remaining terminal phase currents exceeds 120 degrees is selected to be the minuend only if the amplitude of this terminal phase current exceeds a second limit value for the amplitude of the terminal phase currents.

8. A method according to claim 4, wherein the minuend is selected to be the terminal phase current whose amplitude is the highest one if there is no terminal phase current whose absolute phase angle difference from the phase angles of both the remaining terminal phase currents exceeds 120 degrees.

9. A method according to claim 4, wherein the minuend is selected to be the terminal phase current whose amplitude is the highest one if the amplitude of the terminal phase current selected to be the minuend does not exceed the second limit value for the amplitude of the terminal phase currents.

10. A method according to claim 5, wherein the minuend is selected to be the terminal phase current whose amplitude is the highest one if there is no terminal phase current whose absolute phase angle difference from the phase angles of both the remaining terminal phase currents exceeds 120 degrees.

11. A method according to claim 5, wherein the minuend is selected to be the terminal phase current whose amplitude is the highest one if the amplitude of the terminal phase current selected to be the minuend does not exceed the second limit value for the amplitude of the terminal phase currents.

12. A method according to claim 1, wherein the terminal phase current, which is the minuend, is selected to be the terminal phase current whose amplitude is the highest one.

13. A method according to claim 1, wherein a protection operation of the phase to be protected is initiated if at least a value of a differential current exceeds a corresponding threshold value.

14. A method according to claim 13, wherein the protection operation of the phase to be protected is provided if the value of the differential current exceeds the corresponding threshold value and if other conditions for the presence of a fault inside the protected zone are also fulfilled.

15. A three-terminal differential protection system for an electrical power network, the differential protection system comprising
  at least one current measurement device at each terminal of a protected zone of the differential protection system in each phase to be protected for measuring terminal phase currents at each terminal; and
  at least one intelligent electronic device configured to determine a bias current of the phase on the basis of the terminal phase currents obtained by measuring terminal phase currents at each terminal for each phase to be protected, and send a control signal to a respective terminal based on a value determined as a function of the bias current,
  wherein the intelligent electronic device is configured for the bias current determination to subtract phasor values of terminal phase currents of two terminals from the phasor value of the terminal phase current of a remaining one terminal, and
  wherein the terminal phase current, which is a minuend in the subtraction of phasor values, is selected on the basis of a comparison of phase angles or amplitudes of the terminal phase currents among the terminals.

16. A three-terminal differential protection system as claimed in claim 15, wherein the intelligent electronic device is configured to determine the bias current of the phase with $$I_{b(y)} = \frac{1}{X} |\underline{I}_{A(y)} - \underline{I}_{B(y)} - \underline{I}_{C(y)}|$$

wherein $I_{b(y)}$ is the bias current in phase y, y=L1, L2, L3, $\underline{I}_{A(y)}$, $\underline{I}_{B(y)}$ and $\underline{I}_{C(y)}$ are phasor values of the terminal phase currents, and X is a scaling factor.

17. A three-terminal differential protection system as claimed in claim 15, wherein the intelligent electronic device is configured to select the terminal phase current, which is the minuend, to be the terminal phase current whose absolute phase angle difference from the phase angles of both the remaining terminal phase currents exceeds 120 degrees.

18. A three-terminal differential protection system as claimed in claim 15, wherein the intelligent electronic device is configured to:
  determine amplitudes of the terminal phase currents;
  compare the determined amplitudes with a first limit value for the amplitude of the terminal phase currents; and
  if the amplitude of each terminal phase current exceeds the first limit value, determine the phase angles of the terminal phase currents, and select the minuend to be the terminal phase current whose absolute phase angle difference from the phase angles of both the remaining terminal phase currents exceeds 120 degrees.

19. A three-terminal differential protection system as claimed in claim 17, wherein the intelligent electronic device is configured to select the terminal phase current whose absolute phase angle difference from the phase angles of both the remaining terminal phase currents exceeds 120 degrees to be the minuend only if the amplitude of this terminal phase current exceeds a second limit value for the amplitude of the terminal phase currents.

20. A three-terminal differential protection system as claimed in claim 18, wherein the intelligent electronic device is configured to select the terminal phase current whose absolute phase angle difference from the phase angles of both the remaining terminal phase currents exceeds 120 degrees to be the minuend only if the amplitude of this terminal phase current exceeds a second limit value for the amplitude of the terminal phase currents.

21. A three-terminal differential protection system as claimed in claim 16, wherein the intelligent electronic device is configured to select the minuend to be the terminal phase current whose amplitude is the highest one if there is no terminal phase current whose absolute phase angle difference from the phase angles of both the remaining terminal phase currents exceeds 120 degrees.

22. A three-terminal differential protection system as claimed in claim 16, wherein the intelligent electronic device is configured to select the minuend to be the terminal phase current whose amplitude is the highest one if the amplitude of the terminal phase current selected to be the minuend does not exceed the second limit value for the amplitude of the terminal phase currents.

23. A three-terminal differential protection system as claimed in claim 17, wherein the intelligent electronic device is configured to select the minuend to be the terminal phase current whose amplitude is the highest one if there is no terminal phase current whose absolute phase angle difference from the phase angles of both the remaining terminal phase currents exceeds 120 degrees.

24. A three-terminal differential protection system as claimed in claim 17, wherein the intelligent electronic device is configured to select the minuend to be the terminal phase current whose amplitude is the highest one if the amplitude of the terminal phase current selected to be the minuend does not exceed the second limit value for the amplitude of the terminal phase currents.

25. An intelligent electronic device including a processor and a non-transitory computer-readable recording medium, which has recorded thereon a computer program that, when executed by the processor, causes the intelligent electronic device to execute a method in a three-terminal differential protection in an electrical power network, the method comprising:
  measuring a terminal phase current at each terminal of a protected zone of the differential protection in each phase to be protected;
  determining a bias current of the phase on the basis of the terminal phase currents;
  determining whether a fault exists in the protected zone based on a threshold value computed as a function of the bias current; and
  sending a control signal to a terminal of a respective protected zone upon the existence of a fault,
  wherein the determination of the bias current includes subtracting phasor values of the terminal phase currents of two terminals from the phasor value of the terminal phase current of a remaining one terminal, and
wherein the terminal phase current, which is a minuend in the subtraction of phasor values, is selected on the basis of a comparison of phase angles or amplitudes of the terminal phase currents among the terminals.

* * * * *